No. 697,716. Patented Apr. 15, 1902.
A. P. HARTZELL.
APPARATUS FOR LOADING CARS, WAGONS, &c.
(Application filed Oct. 7, 1901.)
(No Model.)
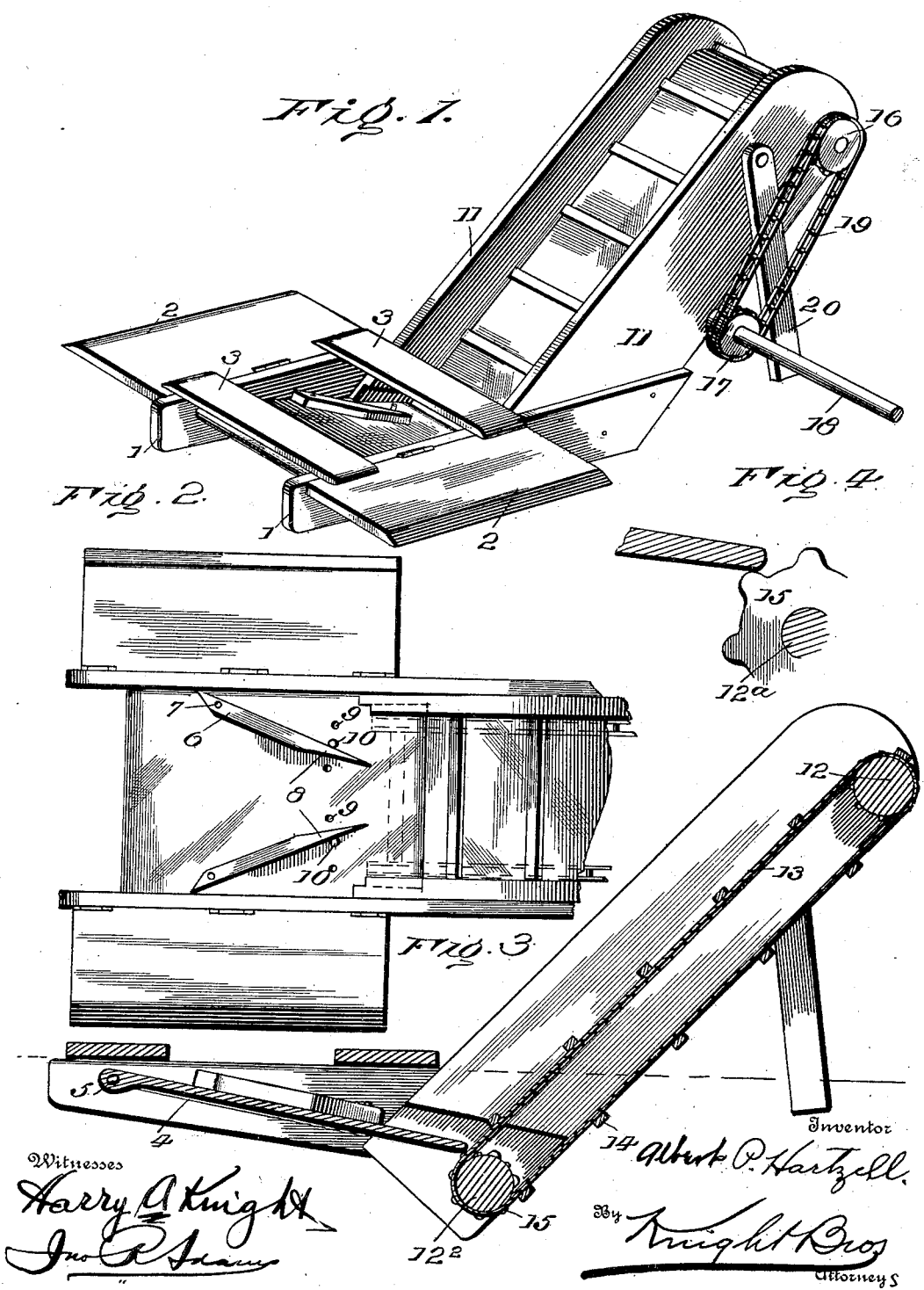

UNITED STATES PATENT OFFICE.

ALBERT PIERCE HARTZELL, OF HUDSON, SOUTH DAKOTA.

APPARATUS FOR LOADING CARS, WAGONS, &c.

SPECIFICATION forming part of Letters Patent No. 697,716, dated April 15, 1902.

Application filed October 7, 1901. Serial No. 77,892. (No model.)

*To all whom it may concern:*

Be it known that I, ALBERT PIERCE HARTZELL, a citizen of the United States, and a resident of Hudson, in the county of Lincoln and State of South Dakota, have invented certain new and useful Improvements in Apparatus for Loading Cars, Wagons, &c., of which the following is a specification.

In the drawings, Figure 1 is a perspective view of my improved loader. Fig. 2 is a top plan view of the same, partly in section and parts removed. Fig. 3 is a central vertical cross-section of Fig. 1. Fig. 4 is a detail view.

1 represents the base-frame, to each side of which are hinged suitable gangways 2.

3 represents gangways projecting from each side of the frame, as clearly seen in Fig. 1.

4 is a shaker or whip board pivotally mounted at one end of the base-frame on a rod 5.

6 represents adjustable guides pivoted at 7 to the shaker-board 4, the said guides being gradually tapered, as at 8, at their forward or loose ends.

9 represents perforations formed in the shaker-board in the path of the forward ends of the guides 6, and 10 represents stop-pins adapted to be secured in said perforations 9, whereby the deflection of said guides 6 is controlled, as clearly shown in Fig. 2.

11 represents the side pieces of a conveyer-chute, the lower ends of which are secured to the base-frame on each side of the shaker-board, the shaker-board being cut away at its forward or loose end to make a close-fitting joint with the sides of said chute.

12 and 12ª are shafts or rollers secured at each end of said chute, upon which is mounted the endless carrier 13, provided with suitable carrying projections or slats 14, said slats extending the entire width of the conveyer-belt. The lower conveyer 12ª is provided at its ends with a toothed wheel 15, which extends above the surface of the conveyer-belt, as clearly seen in Fig. 3.

16 is a sprocket-wheel secured upon one end of the shaft 12 outside of the conveyer-chute 11, and 17 is a spur-wheel rigidly keyed to the shaft 18, one end of said shaft being journaled in the side of the conveyer-chute, as shown in Fig. 1, said sprocket-wheels being connected together by means of the sprocket-chain 19. The shaft 18 may be connected to any suitable source of power.

20 represents standards or supports pivotally secured to each side of the conveyer-chute.

In use the base-frame is placed in a depression in the ground. It will be seen from the drawings that the platform or gangway is so constructed that a team when hitched to a scraper or other vehicle may be driven over the platform and dump the load, whereupon the load is dumped upon the shaker or whip board 4, which by reason of its inclination (shown in Fig. 3) directs the material against the conveyer-belt. The conveyer-belt is now put in operation, whereupon the material is elevated, by means of the slats 14, to the top of the chute, from which it is delivered into a wagon or other suitable vehicle to be carted away. The material on the shaker or whip board is constantly agitated by reason of the engagement of the forward end of said board with the slats on the conveyer and the teeth of the wheel 15, as will be clearly understood.

The guides 6, mounted upon the shaker-board, are, as described, adjustable, so that they may be positioned the proper distance apart to suit the different kinds of material elevated. For instance, with sand it would be desirable to have the guides in comparatively close proximity, inasmuch as this material has a tendency to readily spread, whereas with coarser material it will be desirable to have the guides spread wide apart in order that the material may have free access to the conveyer-belt. The gang-planks 3 afford support for teams in passing over the base.

What I claim, and desire to secure by Letters Patent, is—

1. In a loader, the combination with a base and elevating-conveyer, of a shaker-board pivoted at one end in said base, the other end of the board being free, and means on the shaft of the conveyer engaging the said free end for agitating the said shaker-board.

2. In a loader, the combination with a base and elevating-conveyer, of a shaker-board mounted in said base, and adjustable guides secured on said board to direct the flow of material on said board.

3. In a loader, the combination with a base and an elevating-conveyer, of a shaker-board pivotally mounted within said base and intermittently engaged by the conveyer.

4. In a loader, the combination with a base, a shaker-board pivotally mounted within the same, guides pivotally mounted on the upper face of said board and means adjustable on said board for holding the said guides in different positions.

5. In a loader, the combination with a base and an elevating-conveyer extending upwardly therefrom, of a shaker-board pivotally mounted in said base and toothed wheels mounted on one of the shafts of the conveyer adapted to engage and shake said board.

6. In a loader, the combination with a base and an elevating-conveyer extending upwardly therefrom, of a shaker-board pivotally mounted in said base and extending in the path of the conveyer, guides pivotally mounted on the upper face of said shaker-board, a series of openings in said board in the path of the free ends of said guides, pins adapted to be secured in said openings to hold the guides in the desired adjusted position, toothed wheels secured upon each end of the lower shaft of said conveyer adapted to engage the free end of the shaker-board, gang-planks hinged to each side of the base, and removable gang-planks bridging said brace, means for supporting the conveyer in its elevated position, and means for operating said conveyer.

The foregoing specification signed this 23d day of September, 1901.

ALBERT PIERCE HARTZELL.

In presence of—
HARRISON J. BROWN,
CHAS. F. WHITMORE.